350-274
CROSS REFERENCE SEARCH ROOM
TX350/274

GAP PATTERN FOR CHOPPER OF RADIATION SEARCH SYSTEM

Filed Feb. 5, 1964 2 Sheets-Sheet 1

GAP PATTERN FOR CHOPPER OF RADIATION SEARCH SYSTEM

Filed Feb. 5, 1964 2 Sheets-Sheet 2

United States Patent Office 3,307,039
Patented Feb. 28, 1967

3,307,039
GAP PATTERN FOR CHOPPER OF RADIATION SEARCH SYSTEM

Peter Aemmer, Zurich, Switzerland, assignor to Albiswerk Zurich A.G., Zurich, Switzerland, a Swiss corporation Filed Feb. 5, 1964, Ser. No. 342,743
Claims priority, application Switzerland, Mar. 4, 1963, 2,707/63
8 Claims. (Cl. 250—83.3)

My invention relates to a coordinate indicator for search devices, and particularly to a detector for continuously determining the coordinates of an image point in the image field of an infra-red radiation search device.

Flying bodies or other moving objects which are identifiable by the optical or quasi-optical (infra-red) radiations emanating therefrom may be automatically followed along their paths or remotely controlled along a predetermined path by means of a radiation search device. The search device continuously focuses the radiation emanating from the moving object upon an image field in the device, and, from the coordinates of the image point produced by the rays on the image field determines the incidence angle of these rays relative to the optical axis of the research device. More specifically at the image field a rotating chopper or scanner disc, exhibiting alternate zones of different transparency to incident rays modulates the intensity of the rays passing through the rotating disc according to the coordinate position of the image point in the image field. The modulated beam thus carries information determining the coordinates of the image point.

Known chopper discs produce some inaccuracies.

An object of this invention is to provide a more accurate system of this kind particularly with regard to a chopper disc which will produce more accurate results.

The features of novelty characterizing the invention are pointed out particularly in the claims forming a part of this specification. Other objects and advantages of the invention will become obvious from the following detailed description of an embodiment of the invention when read in light of the accompanying drawings. It will be obvious to those skilled in the art that the invention may be embodied otherwise without departing from its spirit and scope. In the drawings:

Figure 2:
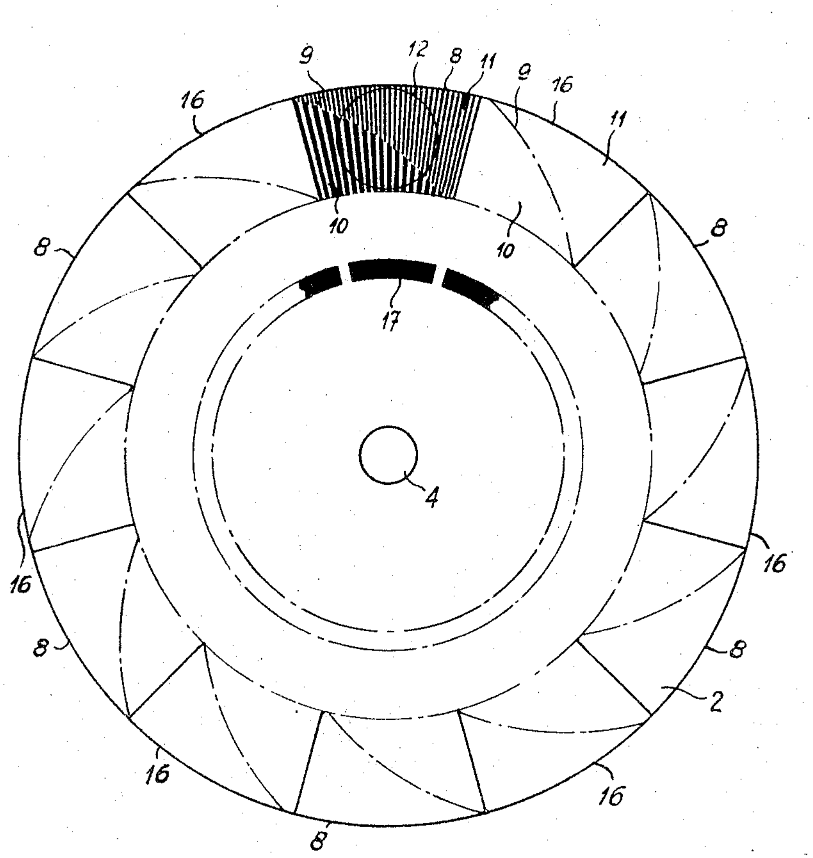
FIG. 2 is a chopper disc for use in the system of FIG. 1, and embodying features of the invention.
Figures 3, 4, 5, 6:
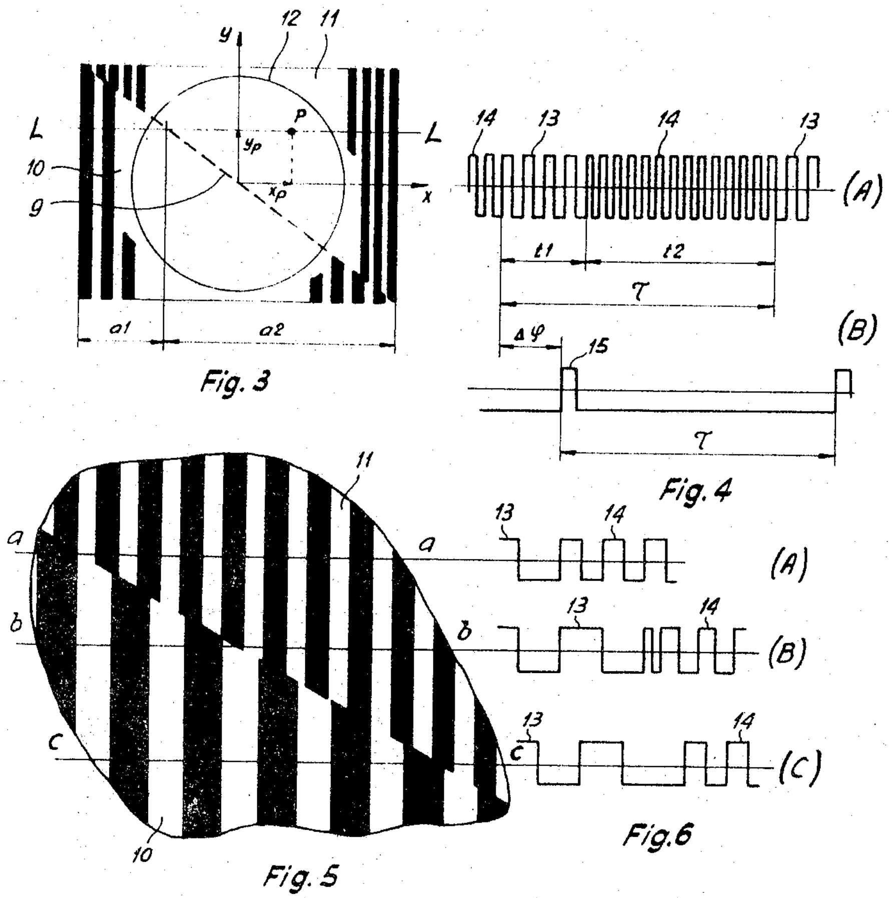
FIG. 3 is a detailed, partially broken away, schematic representation of a section of FIG. 2; wherein the disc radius has been infinitely enlarged for convenience.

FIG. 4 comprises two graphs A and B illustrating the output of a sensor detecting the rays chopped by the chopper disc of FIG. 2, and a timing pulse respectively.

FIG. 5 is an even more detailed representation of a portion of the disc in FIG. 2.

Figure 7:
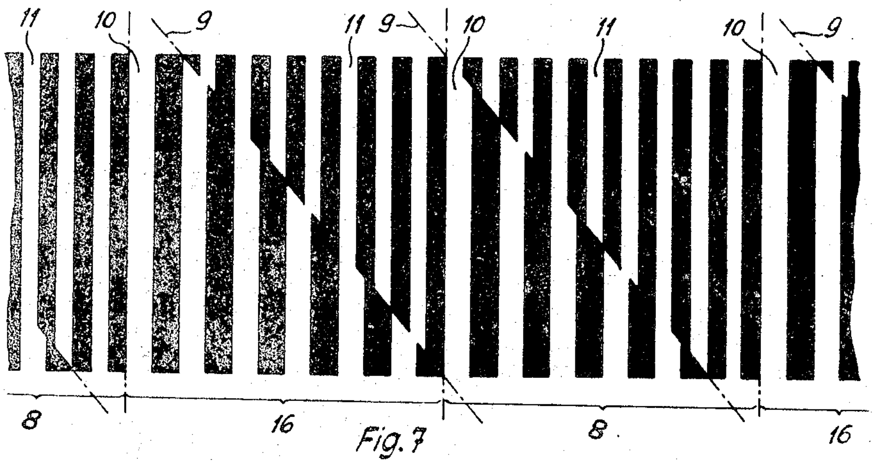

FIG. 6 comprises three graphs A, B, and C illustrating the output of a sensor detecting the rays from three focused image points after they have been chopped along three sections of the chopper disc shown in FIG. 5; and FIG. 7 is a detail diagram of several sections of the disc of FIG. 2 embodying features of the invention.

Figure 1:
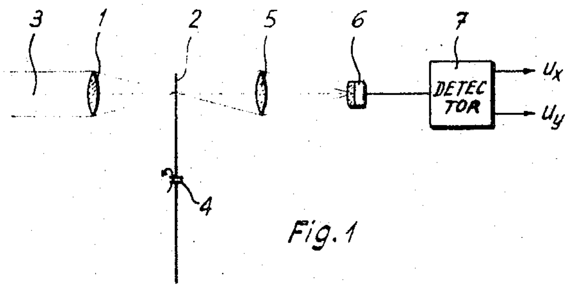
FIG. 1 is a block representation of a search or follower system according to the present invention.

FIG. 1 schematically illustrates the basic concept of a radiation search system. The optical portion thereof comprises an objective 1 for focusing the rays emanating from the object observed upon a chopper or scanning disc 2 rotating in the image plane of the objective and about an axis 4 outside of the optical axis 3 of the system. The chopper disc 2 periodically interrupts passage of the radiation along the systems optical-axis 3. A collector optic 5 on the optical-axis 3 focuses the interrupted radiations upon a radiation sensitive detector cell 6 also on axis 3.

The detector cell 6 produces electrical pulse signals corresponding to the periodically interrupted radiation in an electrical detecting apparatus 7. On the basis of the detected pulse-modulated signals the device 7 indicates position information at its output in the form of voltages $V_x$ and $V_y$ representing the coordinates of an image point on a Cartesian coordinate system drawn at the center of the stationary image field in the plane of the chopper disc 2.

The rotating chopper disc 2 is constructed as partially shown in FIG. 2. The radiation image is focused on the outer circular ring-shaped track having the form of a radial spoke or gap pattern which is periodic in the circular direction of track movement and which repeats itself in sequential sector-forming sections 8 and 16. Only one section of the spoke or gap pattern in FIG. 2 is shown complete. Within any continuous portion of the pattern each spoke angle is equal to the adjacent gap angle and each spoke has a markedly different transparency than the gap. The sections 8 and 16 are almost identical but differ in respects to be discussed. According to the prior art the sections 8 and 16 are identical. A dividing line 9 extending diagonally to the gaps divides each section 8 and section 16 into two fields 10 and 11 wherein the gaps of the pattern occupy respectively different radial angles relative to the disc radius. The ratio of the gap angles of the gap pattern in the two fields of each sector is 1 to 1.5. The circle 12 indicates the outline of the image field.

The sections 8, according to the invention differ in that the diagonal line 9 between fields 10 and 11 in every section 16 is shifted along the track a distance depending upon the relative gap sizes in fields 10 and 11. The line 9 in sections 8 may be shifted in the other direction. The purpose of the shift will be explained more fully with respect to FIG. 7 where the shift is shown more precisely.

FIG. 3 shows a section 8 of FIG. 2 wherein, for simplicity, the disc radius is made infinitely large. The radiation emanating from a point-shaped radiator which the objective 1 focuses to an image point P in the image, field 12, is chopped by the gap pattern of the disc. The track of the latter moves to the left in FIG. 3. Thus the image point P and the image field 12 move, or can be considered to move, to the right relative to the gap pattern of the track. The gap pattern repetition frequency depends upon the gap angles, or widths, and the angular speed of the gap pattern. As the gap pattern moves to the left, the gap angles, or widths, suddenly change from those originally appearing in the field 10 to those appearing in the field 11 when the image passes the borderline 9. Correspondingly, the radiation pulse frequency into detector 6, and the electrical pulse frequency at the output of detector 6, suddenly change as the borderline 9 moves to the left past the image point P.

Chopping in FIG. 3 begins as the pattern moves to the left and the left border of the sector intersects point P. It continues as point P intersects the field 10 over the distance $a1$ and the field 11 over the distance $a2$. In FIG. 4, graph A illustrates the changing-frequency pulse train from detectors 6 as the point P intersects the moving pattern along line L—L (a circle of infinite radius). The time $t1$ of a pulse train 13 of one frequency corresponds to the distance $a1$, and the time $t2$ of the pulse train 14 of higher frequency corresponds to distance $a2$. The letter T designates the total period for chopping by one sector. $T=t1+t2$.

From the pulse train 13 it is possible to determine the coordinates $y_p$ and $x_p$ of the image point P on a coordinate system $x$–$y$ whose null point lies at the center of the stationary image field 12. The coordinate $y_p$ of the image point P is proportional to the distance difference $a2-a1$, as can be ascertained geometrically. Thus the time ratio $t1/t2$ is a measure of the coordinate $y_p$. The coordinate $x_p$ of the image point P is proportional to the angular difference $\Delta\phi$ between the point of frequency change from pulse train 13 to the pulse train 14 and a reference pulse train 15 (FIG. 4, graph B) which is produced by sensing a stationary radiation source with the start of a reference track 17 (FIG. 2) and whose period duration is T. Thus only the time point of the frequency shift in each sector is necessary for evaluating the pulse trains obtained in the described manner.

The measuring accuracy depends essentially upon the accuracy with which these time points can be determined. The switching time from one to the other frequencies of the gap pattern at the borders between the individual sectors is quite definite in the device of FIG. 2. The particular time point of the frequency shift of the pulse signals at the border is also definite. However, certain transfer points at the borderline 9 in the gap pattern do not produce pulse signals which definitely indicate a frequency shift. The cause of this discrepancy is obvious from FIGS. 5 and 6.

FIG. 5 is an enlargement of a portion of the transfer zone at borderline 9, and FIG. 6 has three pulse diagrams A, B and C, which result from the moving pattern intersecting three image points along lines *a—a*, *b—b* and *c—c* in FIG. 5. Pulse diagram A illustrates a recognizable and specific frequency transfer, whereas diagrams B and C for lines *b—b* and *c—c* respectively illustrate disturbances as the pattern intersects image points at the line 9. These disturbances make the precise frequency shift point somewhat vague. For successive sectors 8 chopping a single image point these disturbances manifest themselves by the output signal $V_y$ varying stepwise instead of evenly in dependence upon variation of the coordinate $y_p$.

FIG. 7 illustrates as an embodiment of the invention, several sections 8 and 16, of the chopper disc 2 wherein the above inaccuracy in minimized or wholly obviated. Here in every other section 16 the borderline 9 between the fields 10 and 11 is shifted along the track a constant distance depending upon the ratio of the angular gaps in fields 10 and 11. In operation, as the pattern chops an image point, each section 16 also produces inaccurate output signals having a step-shaped path. However because of the shifts in the position of the borderline 9, the departures from linearity in adjacent sections 8 and 16 are in opposite directions. Thus the shifted borderline 9 permits the departure of the signal output from a linear path in one section effectively to compensate for the departure in the adjacent section. The average output from section to section obtained by time integration or averaging is then effectively linear.

If the proportion of the gap angles in the respective fields of each sector is 2:3, as in FIG. 3, satisfactory results are obtained by shifting the borderline 9 a distance equal to one angular gap of the field having the coarser pattern. The invention can be utilized with similar results with a linearly moving chopper such as one in the shape of an endless film strip.

In FIG. 7 the diagonal 9 in sections 16 can be considered as being shifted in one direction while the diagonal 9 in sections 8 can be considered as being shifted in the other direction.

It will be recognized that the image field 12 and the Cartesian coordinate system are centered on the optical axis 3. Other devices of this general type, also using chopper discs or reticle discs with radial gaps or spokes, are discussed in the copending application for "Coordinate Indicator for Search Devices" of Karl Schmutz, filed on or about the date of this application, and in the application of Arno Welti, Serial No. 32,439 filed November 8, 1963, both assigned to the assignee of this application.

I claim:

1. A chopper disc comprising a circular track having a plurality of alternate radial spokes and gaps of different transparency, said track being divided into angular sections by radial lines, each of said sections being divided diagonally into two fields with spoke patterns having different gap widths and forming a border line angular to said track, the border line of every other section extending from a first point on said track relative to a corresponding one of said radial lines and the border line of every intermediate section extending from a second point on said track relative to said one of said radial lines and spaced from said first point, and a second circular coaxial track having one discontinuity in the section occupied by each of said sections, said discontinuities being located within their sectors in identical angular locations.

2. A chopper as claimed in claim 1, wherein said first point is on said one of said radial lines.

3. A chopper in the radiation path of the sensor of a radiation search system, said chopper comprising an annular track intersecting the radiation path, said track having inner and outer circumferences and comprising a plurality of equal sections each bounded by the inner and outer circumferences of said annular track and a pair of spaced side lines each intersecting each of said inner and outer circumferences at right angles, each of said sections comprising a first gap pattern having gaps of a first width, a second gap pattern having gaps of a second width different from said first width and a border line between said first and second gap patterns extending diagonally to said gap patterns, the border line of each of alternate ones of said sections extending from a first point on the outer circumference of said track relative to a corresponding one of the side lines thereof and the border line of each of the other ones of said sections extending from a second point on the outer circumference of said track relative to said corresponding one of said side lines thereof, said second point being spaced from said first point.

4. A chopper as claimed in claim 3, wherein said chopper is of disc configuration and the side lines of said sections are segments of radial lines.

5. A chopper as claimed in claim 4, wherein the gaps of each of said first and second gap patterns extend radially and the border line of each of said sections extends angularly to the gaps of said first and second gap patterns.

6. A chopper as claimed in claim 3, wherein the spacing between said first and second points depends upon the first and second widths of the gaps of said first and second gap patterns.

7. A chopper as claimed in claim 3, wherein each of said first and second gap patterns comprises a plurality of alternate radial spokes and gaps of different transparency and wherein the spacing between said first and second points is equal to the combined width of a gap of one of said first and second gap patterns and a spoke thereof.

8. A chopper as claimed in claim 3, wherein said first point is at the intersection of said corresponding one of said side lines and the outer circumference of said track and said second point is spaced from said intersection.

References Cited by the Examiner

UNITED STATES PATENTS

| | | | |
|---|---|---|---|
| 3,144,555 | 8/1964 | Aroyan et al. | 250—83.3 |
| 3,219,828 | 11/1965 | Foster | 250—237 X |

RALPH G. NILSON, *Primary Examiner.*

S. ELBAUM, *Assistant Examiner.*